United States Patent
Thompson et al.

(10) Patent No.: US 9,665,762 B2
(45) Date of Patent: May 30, 2017

(54) TIERED WAKEUP STRATEGY

(71) Applicant: Synaptics Incorporated, San Jose, CA (US)

(72) Inventors: Erik Jonathon Thompson, Phoenix, AZ (US); Charles Walter Bellman, Tempe, AZ (US); Anthony P. Russo, New York, NY (US); Philip Yiu Kwong Chan, Fremont, CA (US); Bjoren Kurt Davis, Allston, MA (US); Gregory Lewis Dean, Phoenix, AZ (US); Richard Alexander Erhart, Tempe, AZ (US); Jaswinder Jandu, Chandler, AZ (US); Ty Bao Lien, Gilbert, AZ (US); Frank Schwab, Phoenix, AZ (US)

(73) Assignee: Synaptics Incorporated, San Jose, CA (US)

(*) Notice: Subject to any disclaimer, the term of this patent is extended or adjusted under 35 U.S.C. 154(b) by 66 days.

(21) Appl. No.: 13/766,394

(22) Filed: Feb. 13, 2013

(65) Prior Publication Data

US 2014/0198960 A1     Jul. 17, 2014

Related U.S. Application Data

(60) Provisional application No. 61/751,739, filed on Jan. 11, 2013.

(51) Int. Cl.
*G06K 9/00* (2006.01)
(52) U.S. Cl.
CPC ............................ *G06K 9/00013* (2013.01)
(58) Field of Classification Search
None
See application file for complete search history.

(56) References Cited

U.S. PATENT DOCUMENTS

| 4,151,512 A | 4/1979 | Rigannati et al. |
| 4,225,850 A | 9/1980 | Chang et al. |

(Continued)

FOREIGN PATENT DOCUMENTS

| DE | 2213813 A1 | 10/1973 |
| EP | 0929028 A2 | 1/1998 |

(Continued)

OTHER PUBLICATIONS

Blackberry. 2002. Research in Motion Limited, Waterloo, Ontario, Canada.*

(Continued)

*Primary Examiner* — Chan Park
*Assistant Examiner* — Geoffrey E Summers
(74) *Attorney, Agent, or Firm* — Leydig, Voit & Mayer, Ltd

(57) ABSTRACT

A biometric authentication apparatus and method is disclosed which may comprise a biometric authentication unit which may comprise: a biometric object sensor comprising sensor elements and a sensor computing device; a wake-on-event logic controller maintaining the sensor computing device in one of a powered-off or powered down mode, and including a bulk biometric object detector configured to detect a biometric object on or in the vicinity of the sensor elements and to power-on or power-up the sensor computing device responsive to the detection of the biometric object on or in the vicinity of the sensor elements; the sensor computing device configured to analyze one or more lines of biometric object image comprising a partial biometric object image and determine if the partial biometric image belongs to a biometric object desired to be imaged to obtain a complete biometric object image, and to provide a power-on or power-up signal to a host electronic device computing (Continued)

device when the partial biometric image is determined to belong to a biometric object desired to be imaged.

24 Claims, 3 Drawing Sheets

(56) References Cited

U.S. PATENT DOCUMENTS

| | | | |
|---|---|---|---|
| 4,310,827 A | 1/1982 | Asi | |
| 4,353,056 A * | 10/1982 | Tsikos | 382/124 |
| 4,405,829 A | 9/1983 | Rivest et al. | |
| 4,525,859 A | 6/1985 | Bowles et al. | |
| 4,550,221 A | 10/1985 | Mabusth | |
| 4,580,790 A | 4/1986 | Doose | |
| 4,582,985 A | 4/1986 | Loftberg | |
| 4,675,544 A | 6/1987 | Shrenk | |
| 4,758,622 A | 7/1988 | Gosselin | |
| 4,817,183 A | 3/1989 | Sparrow | |
| 5,076,566 A | 12/1991 | Kriegel | |
| 5,109,427 A | 4/1992 | Yang | |
| 5,140,642 A | 8/1992 | Hau et al. | |
| 5,305,017 A | 4/1994 | Gerpheide | |
| 5,319,323 A | 6/1994 | Fong | |
| 5,325,442 A | 6/1994 | Knapp | |
| 5,359,243 A | 10/1994 | Norman | |
| 5,420,936 A | 5/1995 | Fitzpatrick et al. | |
| 5,422,807 A | 6/1995 | Mitra et al. | |
| 5,429,006 A | 7/1995 | Tamori | |
| 5,456,256 A | 10/1995 | Schneider et al. | |
| 5,515,738 A | 5/1996 | Tamori | |
| 5,543,591 A | 8/1996 | Gillespie et al. | |
| 5,569,901 A | 10/1996 | Bridgelall et al. | |
| 5,623,552 A | 4/1997 | Lane | |
| 5,627,316 A | 5/1997 | De Winter et al. | |
| 5,650,842 A | 7/1997 | Maase et al. | |
| 5,717,777 A | 2/1998 | Wong et al. | |
| 5,781,651 A | 7/1998 | Hsiao et al. | |
| 5,801,681 A | 9/1998 | Sayag | |
| 5,818,956 A | 10/1998 | Tuli | |
| 5,838,306 A | 11/1998 | O'Connor | |
| 5,848,176 A | 12/1998 | Harra et al. | |
| 5,850,450 A | 12/1998 | Schweitzer et al. | |
| 5,852,670 A | 12/1998 | Setlak et al. | |
| 5,864,296 A | 1/1999 | Upton | |
| 5,887,343 A | 3/1999 | Salatino et al. | |
| 5,892,824 A | 4/1999 | Beatson et al. | |
| 5,903,225 A | 5/1999 | Schmitt et al. | |
| 5,915,757 A | 6/1999 | Tsuyama et al. | |
| 5,920,384 A | 7/1999 | Borza | |
| 5,920,640 A | 7/1999 | Salatino et al. | |
| 5,940,526 A | 8/1999 | Setlak et al. | |
| 5,963,679 A | 10/1999 | Setlak | |
| 5,995,630 A | 11/1999 | Borza | |
| 5,999,637 A | 12/1999 | Toyoda et al. | |
| 6,002,815 A | 12/1999 | Immega et al. | |
| 6,011,859 A | 1/2000 | Kalnitsky et al. | |
| 6,016,355 A | 1/2000 | Dickinson et al. | |
| 6,052,475 A | 4/2000 | Upton | |
| 6,067,368 A | 5/2000 | Setlak et al. | |
| 6,073,343 A | 6/2000 | Petrick et al. | |
| 6,076,566 A | 6/2000 | Lowe | |
| 6,088,585 A | 7/2000 | Schmitt et al. | |
| 6,098,175 A | 8/2000 | Lee | |
| 6,118,318 A | 9/2000 | Fifield et al. | |
| 6,134,340 A | 10/2000 | Hsu et al. | |
| 6,157,722 A | 12/2000 | Lerner et al. | |
| 6,161,213 A | 12/2000 | Lofstrom | |
| 6,175,407 B1 | 1/2001 | Santor | |
| 6,182,076 B1 | 1/2001 | Yu et al. | |
| 6,182,892 B1 | 2/2001 | Angelo et al. | |
| 6,185,318 B1 | 2/2001 | Jain et al. | |
| 6,234,031 B1 | 5/2001 | Suga | |
| 6,241,288 B1 | 6/2001 | Bergenek et al. | |
| 6,259,108 B1 | 7/2001 | Antonelli et al. | |
| 6,289,114 B1 | 9/2001 | Mainguet | |
| 6,292,272 B1 | 9/2001 | Okauchi et al. | |
| 6,317,508 B1 | 11/2001 | Kramer et al. | |
| 6,320,394 B1 | 11/2001 | Tartagni | |
| 6,325,285 B1 | 12/2001 | Baratelli | |
| 6,327,376 B1 | 12/2001 | Harkin | |
| 6,330,345 B1 | 12/2001 | Russo et al. | |
| 6,332,193 B1 | 12/2001 | Glass et al. | |
| 6,333,989 B1 | 12/2001 | Borza | |
| 6,337,919 B1 | 1/2002 | Duton | |
| 6,343,162 B1 | 1/2002 | Saito et al. | |
| 6,346,739 B1 | 2/2002 | Lepert et al. | |
| 6,347,040 B1 | 2/2002 | Fries et al. | |
| 6,357,663 B1 | 3/2002 | Takahashi et al. | |
| 6,360,004 B1 | 3/2002 | Akizuki | |
| 6,362,633 B1 | 3/2002 | Tartagni | |
| 6,392,636 B1 | 5/2002 | Ferrari et al. | |
| 6,399,994 B2 | 6/2002 | Shobu | |
| 6,400,836 B2 | 6/2002 | Senior | |
| 6,408,087 B1 | 6/2002 | Kramer | |
| 6,459,804 B2 | 10/2002 | Mainguet | |
| 6,473,072 B1 | 10/2002 | Comiskey et al. | |
| 6,509,501 B2 | 1/2003 | Eicken et al. | |
| 6,525,547 B2 | 2/2003 | Hayes | |
| 6,525,932 B1 | 2/2003 | Ohnishi et al. | |
| 6,535,622 B1 | 3/2003 | Russo et al. | |
| 6,539,101 B1 | 3/2003 | Black | |
| 6,546,122 B1 | 4/2003 | Russo | |
| 6,580,816 B2 | 6/2003 | Kramer et al. | |
| 6,597,289 B2 | 7/2003 | Sabatini | |
| 6,628,812 B1 | 9/2003 | Setlak et al. | |
| 6,631,201 B1 | 10/2003 | Dickinson et al. | |
| 6,643,389 B1 | 11/2003 | Raynal et al. | |
| 6,672,174 B2 | 1/2004 | Deconde et al. | |
| 6,710,416 B1 | 3/2004 | Chou et al. | |
| 6,738,050 B2 | 5/2004 | Comiskey et al. | |
| 6,741,729 B2 | 5/2004 | Bjorn et al. | |
| 6,757,002 B1 | 6/2004 | Oross et al. | |
| 6,766,040 B1 | 7/2004 | Catalano et al. | |
| 6,785,407 B1 | 8/2004 | Tschudi et al. | |
| 6,799,275 B1 | 9/2004 | Bjorn et al. | |
| 6,836,230 B2 | 12/2004 | Le Pailleur et al. | |
| 6,838,905 B1 | 1/2005 | Doyle | |
| 6,862,942 B2 | 3/2005 | Kawahata | |
| 6,873,356 B1 | 3/2005 | Kanbe et al. | |
| 6,886,104 B1 | 4/2005 | McClurg et al. | |
| 6,897,002 B2 | 5/2005 | Teraoka et al. | |
| 6,898,299 B1 | 5/2005 | Brooks | |
| 6,924,496 B2 | 8/2005 | Manansala | |
| 6,937,748 B1 | 8/2005 | Schneider et al. | |
| 6,941,001 B1 | 9/2005 | Bolle et al. | |
| 6,941,810 B2 | 9/2005 | Okada | |
| 6,950,540 B2 | 9/2005 | Higuchi | |
| 6,959,874 B2 | 11/2005 | Bardwell | |
| 6,963,626 B1 | 11/2005 | Shaeffer et al. | |
| 6,970,584 B2 | 11/2005 | O'Gorman et al. | |
| 6,980,672 B2 | 12/2005 | Saito et al. | |
| 6,983,882 B2 | 1/2006 | Cassone | |
| 7,013,030 B2 | 3/2006 | Wong et al. | |
| 7,020,591 B1 | 3/2006 | Wei et al. | |
| 7,030,860 B1 | 4/2006 | Hsu et al. | |
| 7,031,670 B2 | 4/2006 | May | |
| 7,035,443 B2 | 4/2006 | Wong | |
| 7,042,535 B2 | 5/2006 | Katoh et al. | |
| 7,043,061 B2 | 5/2006 | Hamid et al. | |
| 7,043,644 B2 | 5/2006 | DeBruine | |
| 7,046,230 B2 | 5/2006 | Zadesky et al. | |
| 7,064,743 B2 | 6/2006 | Nishikawa | |
| 7,099,496 B2 * | 8/2006 | Benkley, III | 382/124 |
| 7,110,574 B2 | 9/2006 | Haruki et al. | |
| 7,110,577 B1 | 9/2006 | Tschud | |
| 7,113,622 B2 | 9/2006 | Hamid | |
| 7,126,389 B1 | 10/2006 | McRae et al. | |
| 7,129,926 B2 | 10/2006 | Mathiassen et al. | |
| 7,136,514 B1 | 11/2006 | Wong | |
| 7,146,024 B2 | 12/2006 | Benkley | |
| 7,146,026 B2 | 12/2006 | Russon et al. | |
| 7,146,029 B2 | 12/2006 | Manansala | |
| 7,184,581 B2 | 2/2007 | Johansen et al. | |
| 7,190,209 B2 | 3/2007 | Kang et al. | |

(56) References Cited

U.S. PATENT DOCUMENTS

| | | |
|---|---|---|
| 7,190,816 B2 | 3/2007 | Mitsuyu et al. |
| 7,194,392 B2 | 3/2007 | Tuken et al. |
| 7,197,168 B2 | 3/2007 | Russo |
| 7,200,250 B2 * | 4/2007 | Chou .......................... 382/124 |
| 7,251,351 B2 | 7/2007 | Mathiassen et al. |
| 7,258,279 B2 | 8/2007 | Schneider et al. |
| 7,260,246 B2 | 8/2007 | Fujii |
| 7,263,212 B2 | 8/2007 | Kawabe |
| 7,263,213 B2 | 8/2007 | Rowe |
| 7,289,649 B1 | 10/2007 | Walley et al. |
| 7,290,323 B2 | 11/2007 | Deconde et al. |
| 7,308,121 B2 | 12/2007 | Mathiassen et al. |
| 7,308,122 B2 | 12/2007 | McClurg et al. |
| 7,321,672 B2 | 1/2008 | Sasaki et al. |
| 7,356,169 B2 | 4/2008 | Hamid |
| 7,360,688 B1 | 4/2008 | Harris |
| 7,369,685 B2 | 5/2008 | DeLeon |
| 7,379,569 B2 | 5/2008 | Chikazawa et al. |
| 7,408,135 B2 | 8/2008 | Fujeda |
| 7,409,876 B2 | 8/2008 | Ganapathi et al. |
| 7,412,083 B2 | 8/2008 | Takahashi |
| 7,424,618 B2 | 9/2008 | Roy et al. |
| 7,447,339 B2 | 11/2008 | Mimura et al. |
| 7,447,911 B2 | 11/2008 | Chou et al. |
| 7,460,697 B2 | 12/2008 | Erhart et al. |
| 7,463,756 B2 | 12/2008 | Benkley |
| 7,474,772 B2 | 1/2009 | Russo et al. |
| 7,505,611 B2 | 3/2009 | Fyke |
| 7,505,613 B2 | 3/2009 | Russo |
| 7,565,548 B2 | 7/2009 | Fiske et al. |
| 7,574,022 B2 | 8/2009 | Russo |
| 7,596,832 B2 | 10/2009 | Hsieh et al. |
| 7,599,530 B2 | 10/2009 | Boshra |
| 7,616,787 B2 | 11/2009 | Boshra |
| 7,634,117 B2 | 12/2009 | Cho |
| 7,643,950 B1 | 1/2010 | Getzin et al. |
| 7,646,897 B2 | 1/2010 | Fyke |
| 7,681,232 B2 | 3/2010 | Nordentoft et al. |
| 7,689,013 B2 | 3/2010 | Shinzaki |
| 7,706,581 B2 | 4/2010 | Drews et al. |
| 7,733,697 B2 | 6/2010 | Picca et al. |
| 7,751,601 B2 | 7/2010 | Benkley |
| 7,826,645 B1 * | 11/2010 | Cayen .......................... 382/124 |
| 7,831,070 B1 * | 11/2010 | Cheng et al. ................ 382/124 |
| 7,843,438 B2 | 11/2010 | Onoda |
| 7,848,798 B2 | 12/2010 | Martinsen et al. |
| 7,899,216 B2 | 3/2011 | Watanabe et al. |
| 7,953,258 B2 | 5/2011 | Dean et al. |
| 8,005,276 B2 | 8/2011 | Dean et al. |
| 8,031,046 B2 | 10/2011 | Franza et al. |
| 8,031,916 B2 | 10/2011 | Abiko et al. |
| 8,063,734 B2 | 11/2011 | Conforti |
| 8,077,935 B2 | 12/2011 | Geoffroy et al. |
| 8,107,212 B2 | 1/2012 | Nelson et al. |
| 8,116,540 B2 | 2/2012 | Dean et al. |
| 8,131,026 B2 | 3/2012 | Benkley et al. |
| 8,165,355 B2 | 4/2012 | Benkley et al. |
| 8,175,345 B2 | 5/2012 | Gardner |
| 8,204,281 B2 | 6/2012 | Satya et al. |
| 8,224,044 B2 | 7/2012 | Benkley |
| 8,229,184 B2 | 7/2012 | Benkley |
| 8,276,816 B2 | 10/2012 | Gardner |
| 8,278,946 B2 | 10/2012 | Thompson |
| 8,290,150 B2 | 10/2012 | Erhart et al. |
| 8,315,444 B2 | 11/2012 | Gardner |
| 8,331,096 B2 | 12/2012 | Garcia |
| 8,358,815 B2 | 1/2013 | Benkley et al. |
| 8,374,407 B2 | 2/2013 | Benkley et al. |
| 8,391,568 B2 | 3/2013 | Satyan |
| 8,616,451 B1 | 12/2013 | Rao |
| 2001/0026636 A1 | 10/2001 | Mainget |
| 2001/0030644 A1 | 10/2001 | Allport |
| 2001/0036299 A1 | 11/2001 | Senior |
| 2001/0043728 A1 | 11/2001 | Kramer et al. |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1 | 6/2002 | Griffis |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0152048 A1 | 10/2002 | Hayes |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0063782 A1 | 4/2003 | Acharya et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0095690 A1 | 5/2003 | Su et al. |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fujii |
| 2003/0161512 A1 | 8/2003 | Mathiassen |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0017934 A1 | 1/2004 | Kocher et al. |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito et al. |
| 2004/0136612 A1 | 7/2004 | Meister et al. |
| 2004/0155752 A1 * | 8/2004 | Radke .......................... 340/5.53 |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0188838 A1 | 9/2004 | Okada et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0001711 A1 * | 1/2005 | Doughty et al. ............ 340/5.74 |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0100938 A1 | 5/2005 | Hoffmann et al. |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishi et al. |
| 2005/0129291 A1 | 6/2005 | Boshra |
| 2005/0136200 A1 | 6/2005 | Durell et al. |
| 2005/0139656 A1 | 6/2005 | Arnouse |
| 2005/0139685 A1 | 6/2005 | Kozlay |
| 2005/0162402 A1 | 7/2005 | Watanachote |
| 2005/0169503 A1 * | 8/2005 | Howell et al. ................ 382/115 |

(56) References Cited

U.S. PATENT DOCUMENTS

| | | |
|---|---|---|
| 2005/0174015 A1 | 8/2005 | Scott et al. |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0247559 A1 | 11/2005 | Frey et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0055500 A1 | 3/2006 | Burke et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Fukushige et al. |
| 2006/0181521 A1 | 8/2006 | Perrault et al. |
| 2006/0182319 A1 | 8/2006 | Setlank et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0214767 A1 | 9/2006 | Carrieri |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0267125 A1 | 11/2006 | Huang et al. |
| 2006/0267385 A1 | 11/2006 | Steenwyk et al. |
| 2006/0271793 A1 | 11/2006 | Devadas et al. |
| 2006/0285728 A1 | 12/2006 | Leung et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0058843 A1 | 3/2007 | Theis et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0154072 A1 | 7/2007 | Taraba et al. |
| 2007/0160269 A1 | 7/2007 | Kuo |
| 2007/0180261 A1 | 8/2007 | Akkermans et al. |
| 2007/0196002 A1 | 8/2007 | Choi et al. |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0237368 A1 | 10/2007 | Bjorn et al. |
| 2007/0248249 A1 | 10/2007 | Stoianov |
| 2007/0290124 A1 | 12/2007 | Neil et al. |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 3/2008 | Champagne et al. |
| 2008/0113685 A1* | 5/2008 | Ishida et al. ............... 455/556.1 |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott et al. |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0201265 A1 | 8/2008 | Hewton |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0240523 A1 | 10/2008 | Benkley et al. |
| 2008/0240537 A1 | 10/2008 | Yang et al. |
| 2008/0244277 A1 | 10/2008 | Orsini et al. |
| 2008/0267462 A1 | 10/2008 | Nelson et al. |
| 2008/0279373 A1 | 11/2008 | Erhart et al. |
| 2008/0317290 A1 | 12/2008 | Tazoe |
| 2009/0001999 A1 | 1/2009 | Douglas |
| 2009/0130369 A1 | 5/2009 | Huang et al. |
| 2009/0153297 A1 | 6/2009 | Gardner |
| 2009/0154779 A1 | 6/2009 | Satyan et al. |
| 2009/0155456 A1 | 6/2009 | Benkley et al. |
| 2009/0169071 A1 | 7/2009 | Bond et al. |
| 2009/0174974 A1 | 7/2009 | Huang et al. |
| 2009/0212902 A1 | 8/2009 | Haddock |
| 2009/0218698 A1 | 9/2009 | Lam |
| 2009/0237135 A1 | 9/2009 | Ramaraju et al. |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0279742 A1 | 11/2009 | Abiko |
| 2009/0319435 A1 | 12/2009 | Little et al. |
| 2009/0324028 A1 | 12/2009 | Russo |
| 2010/0026451 A1 | 2/2010 | Erhart et al. |
| 2010/0045705 A1 | 2/2010 | Vertegaal et al. |
| 2010/0075631 A1* | 3/2010 | Black et al. ............... 455/410 |
| 2010/0083000 A1 | 4/2010 | Kesanupalli |
| 2010/0117794 A1 | 5/2010 | Adams et al. |
| 2010/0119124 A1 | 5/2010 | Satyan |
| 2010/0123675 A1 | 5/2010 | Ippel |
| 2010/0127366 A1 | 5/2010 | Bond et al. |
| 2010/0176823 A1 | 7/2010 | Thompson et al. |
| 2010/0176892 A1 | 7/2010 | Thompson et al. |
| 2010/0177940 A1 | 7/2010 | Thompson et al. |
| 2010/0180136 A1* | 7/2010 | Thompson et al. .......... 713/324 |
| 2010/0189314 A1* | 7/2010 | Benkley et al. ............. 382/124 |
| 2010/0208953 A1 | 8/2010 | Gardner et al. |
| 2010/0244166 A1 | 9/2010 | Shibuta et al. |
| 2010/0272329 A1 | 10/2010 | Benkley |
| 2010/0284565 A1 | 11/2010 | Benkley et al. |
| 2010/0313050 A1* | 12/2010 | Harrat et al. ............... 713/323 |
| 2011/0002461 A1 | 1/2011 | Erhart et al. |
| 2011/0018556 A1 | 1/2011 | Le et al. |
| 2011/0082791 A1 | 4/2011 | Baghasaryan et al. |
| 2011/0082800 A1 | 4/2011 | Baghasaryan et al. |
| 2011/0082801 A1 | 4/2011 | Baghasaryan et al. |
| 2011/0082802 A1 | 4/2011 | Baghasaryan et al. |
| 2011/0083016 A1 | 4/2011 | Kesanupalli et al. |
| 2011/0083018 A1 | 4/2011 | Kesanupalli et al. |
| 2011/0083170 A1 | 4/2011 | Kesanupalli et al. |
| 2011/0083173 A1* | 4/2011 | Baghdasaryan et al. ......... 726/7 |
| 2011/0090047 A1 | 4/2011 | Patel |
| 2011/0102567 A1 | 5/2011 | Erhart |
| 2011/0102569 A1 | 5/2011 | Erhart |
| 2011/0134573 A1* | 6/2011 | Kim et al. ............... 348/164 |
| 2011/0138450 A1 | 6/2011 | Kesanupalli et al. |
| 2011/0175703 A1 | 7/2011 | Benkley |
| 2011/0176037 A1 | 7/2011 | Benkley |
| 2011/0182486 A1 | 7/2011 | Valfridsson et al. |
| 2011/0214924 A1 | 9/2011 | Perezselsky et al. |
| 2011/0267298 A1 | 11/2011 | Erhart et al. |
| 2011/0298711 A1 | 12/2011 | Dean et al. |
| 2011/0304001 A1 | 12/2011 | Erhart et al. |
| 2012/0044639 A1 | 2/2012 | Garcia |
| 2012/0189166 A1 | 7/2012 | Russo |
| 2012/0189172 A1 | 7/2012 | Russo |
| 2012/0206586 A1 | 8/2012 | Gardner |
| 2012/0256280 A1 | 10/2012 | Erhart |
| 2012/0257032 A1 | 10/2012 | Benkley |
| 2012/0308092 A1 | 12/2012 | Benkley et al. |
| 2013/0021044 A1 | 1/2013 | Thompson et al. |
| 2013/0094715 A1 | 4/2013 | Benkley et al. |
| 2013/0279768 A1 | 10/2013 | Boshra |
| 2014/0026208 A1 | 1/2014 | Coons |

(56) References Cited

U.S. PATENT DOCUMENTS

FOREIGN PATENT DOCUMENTS

| | | |
|---|---|---|
| EP | 0905646 A1 | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1775674 A1 | 4/2007 |
| EP | 1939788 A1 | 7/2008 |
| GB | 2331613 A | 5/1999 |
| GB | 2480919 | 12/2011 |
| GB | 2487661 A1 | 8/2012 |
| GB | 2489100 A | 9/2012 |
| GB | 2490192 | 10/2012 |
| GB | 2474999 B | 2/2013 |
| JP | 01094418 A2 | 4/1989 |
| JP | 04158434 A2 | 6/1992 |
| JP | 2005011002 A | 1/2005 |
| JP | 2005242856 | 9/2005 |
| JP | 2007305097 A | 11/2007 |
| TW | 200606745 A | 2/2006 |
| TW | 200606746 | 2/2006 |
| TW | 200614092 | 5/2006 |
| TW | 200617798 | 6/2006 |
| TW | 200620140 A | 6/2006 |
| TW | 200629167 A | 8/2006 |
| WO | WO 90/03620 A1 | 4/1990 |
| WO | WO 98/58342 A1 | 12/1998 |
| WO | WO 99/28701 A1 | 6/1999 |
| WO | WO 99/43258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 01/95304 A1 | 12/2001 |
| WO | WO 02/11066 A1 | 2/2002 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/104012 A1 | 11/2005 |
| WO | WO 2005/106774 A2 | 11/2005 |
| WO | WO 2005/106774 A3 | 11/2005 |
| WO | WO 2006/040724 A1 | 4/2006 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/088248 A1 | 1/2011 |
| WO | WO/2011/088252 A1 | 1/2011 |
| WO | WO 2011/053797 A1 | 5/2011 |

OTHER PUBLICATIONS

"Bona fide, adv. and adj." OED Online. Oxford University Press, Jun. 2014. Web. Jul. 17, 2014.*

Droid. 2009. Lucasfilm Ltd., San Fransisco, CA, USA.*

Matsumoto et al., Impact of Artificial "Gummy" Fingers on Fingerprint Systems, SPIE 4677 (2002), reprinted from cryptome.org.

Maltoni, "Handbook of Fingerprint Recognition", XP002355942 Springer, New York, USA, Jun. 2003 (Jun. 2003) pp. 65-69.

Vermasan, et al., "A500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006 (Mar. 1, 2006), pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008 (May 31, 2008), pp. 1-149, XP002630374, Retrieved from the Internet: URL:http://alexandria.tue.nl/extra1/afstversl/wsk-i/hgt2008.pdf [retrieved on Mar. 29, 2011] *pp. 127-134, paragraph 6.2*.

Gassend, et al., "Controlled Physical Random Functions", In Proceedings of the 18th Annual Computer Security Conference, Las Vegas, Nevada, Dec. 12, 2002.

Wikipedia (Mar. 2003). "Integrated Circuit," http://en.wikipedia.org/wiki/integrated_circuit. Revision as of Mar. 23, 2003.

Wikipedia (Dec. 2006). "Integrated circuit" Revision as of Dec. 10, 2006. http://en.widipedia.org/wiki/Integrated_circuit.

Bellagiodesigns.com (Internet Archive Wayback Machine, www.bellagiodesigns.com date: Oct. 29, 2005).

Closed Loop Systems, The Free Dictionary, http://www.thefreedictionary.com/closed-loop+system (downloaded Dec. 1, 2011).

Feedback: Electronic Engineering, Wikipedia, p. 5 http://en.wikipedia.org/wiki/Feedback#Electronic_engineering (downloaded Dec. 1, 2011).

Galy et al. (Jul. 2007) "A full fingerprint verification system for a single-line sweep sensor." IEEE Sensors J., vol. 7 No. 7, pp. 1054-1065.

* cited by examiner

|  | Sensor | Host |  |
|---|---|---|---|
|  | Low Power WOE | High Power CPU |  |
| Stage 1 | Polling | Sleeping | Sleeping |
| Stage 2 | Not Polling | Awake-Calculating to validate | Sleeping |
| Stage 3 | Not Polling | Awake | Awake |

FIGURE 1

TIERED WAKEUP STRATEGY

CROSS-REFERENCE

This application claims the benefit of U.S. Provisional Application No. 61/751,739, filed Jan. 11, 2013, which application is incorporated herein by reference.

BACKGROUND

Currently, numerous digital devices contain a user authentication apparatus, such as finger scanners that authenticate a user's identities by utilizing an image of the users fingerprint to match against a stored template fingerprint image and/or otherwise matching, e.g., utilizing fingerprint minutia extracted from such an image. Many such authentication devices are portable and battery powered. It is therefore essential that the power consumed by the operation of the authentication devices be kept to a minimum. What is needed, but has yet been provided, is a digital device that can contain an authentication device, such as a finger image scanner, which operates with minimal power consumption.

U.S. Pat. No. 8,278,946 B2, entitled APPARATUS AND METHOD FOR DETECTING FINGER ACTIVITY ON A FINGERPRINT SENSOR, issued on Oct. 2, 2012, and owned by the assignee of the present application discloses detection of bulk finger presence on or in the vicinity of the sensor elements. United States Pub. US2010/0180136A1 published on Jul. 15, 2010, entitled ULTRA LOW POWER WAKE-ON-EVENT MODE FOR BIOMETRIC SYSTEMS, and owned by the assignee of the present application discloses wake-on-event modes of operation for capacitive gap fingerprint sensors. United States Pub. US2010/0189314A1 published on Jul. 29, 2010, entitled LIVE FINGER DETECTION discloses bulk finger detection on or near capacitive gap fingerprint sensor elements.

SUMMARY

A biometric authentication apparatus and method is disclosed. The authentication apparatus may comprise a biometric authentication unit which may comprise: a biometric object sensor comprising sensor elements and a sensor computing device; a wake-on-event logic controller maintaining the sensor computing device in one of a powered-off or powered down mode, and including a bulk biometric object detector configured to detect a biometric object on or in the vicinity of the sensor elements and to power-on or power-up the sensor computing device responsive to the detection of the biometric object on or in the vicinity of the sensor elements; the sensor computing device configured to analyze one or more lines of biometric object image comprising a partial biometric object image and determine if the partial biometric image belongs to a biometric object desired to be imaged to obtain a complete biometric object image, and to provide a power-on or power-up signal to a host electronic device computing device when the partial biometric image is determined to belong to a biometric object desired to be imaged.

The biometric authentication unit may further comprise the biometric object comprising a finger and the complete biometric object image comprising a fingerprint. The host electronic device may comprise a housing; and the sensor computing device and the host electronic device computing device being housed within the housing. The sensor elements may be exposed to the biometric object through the housing. The sensor computing device and the host electronic device computing device may share a memory.

The biometric authentication unit may comprise the sensor computing device and the host electronic device computing device sharing in the analysis of the one or more lines of biometric object image comprising a partial biometric object image and determine if the partial biometric image belongs to a biometric object desired to be imaged, and the host electronic device computing device may be powered on, e.g., from an off or sleep mode, at least to the extent of being configured to share in the analysis of the partial biometric object image. The memory may be at least in part contained in or is a peripheral to the host electronic device computing device, e.g., as a memory unit connected to the CPU of the host electronic device computing device, e.g., connected directly to the CPU over a memory bus and/or controlled as to access by a memory management unit within or as another peripheral device to the CPU. The host electronic device may be powered on at least to the extent of being configured to share the memory with the sensor computing device while the sensor computing device is analyzing the one or more lines of biometric object image comprising a partial biometric object image and determine if the partial biometric image belongs to a biometric object desired to be imaged.

The biometric authentication unit may further comprise the biometric object sensor elements forming a linear one dimensional capacitive gap sensor array or a two dimensional placement capacitive sensor array or a two dimensional swiped capacitive sensor array.

A biometric authentication method may comprise providing a biometric object sensor comprising sensor elements and a sensor computing device; utilizing a wake-on-event logic controller maintaining the sensor computing device in one of a powered-off or powered down mode, and including a bulk biometric object detector to detect a biometric object on or in the vicinity of the sensor elements and to power-on or power-up the sensor computing device responsive to the detection of the biometric object on or in the vicinity of the sensor elements; analyzing with the sensor computing device one or more lines of biometric object image comprising a partial biometric object image and determining if the partial biometric image belongs to a biometric object desired to be imaged to obtain a complete biometric object image; and providing a power-on or power-up signal to a host electronic device computing device when the partial biometric image is determined to belong to a biometric object desired to be imaged.

A machine readable medium storing instructions that, when executed by at least one computing device, may cause the at least one computing device to perform a biometric authentication method on a biometric object sensor comprising sensor elements and a sensor computing device is disclosed, which may comprise: controlling a wake-on-event logic controller maintaining the sensor computing device in one of a powered-off or powered-down mode, and detecting, in conjunction with a bulk biometric object detector, a biometric object on or in the vicinity of the sensor elements, and powering on or powering up the sensor computing device in response to the detection of the biometric object on or in the vicinity of the sensor elements; analyzing with the sensor computing device one or more lines of biometric object image comprising a partial biometric object image and determining if the partial biometric image belongs to a biometric object desired to be imaged to obtain a complete biometric object image; and providing a power-on or power-up signal to a host electronic device computing device when the partial biometric image is determined to belong to a biometric object desired to be imaged.

The biometric authentication may comprise wherein the biometric authentication unit is incorporated into a user authentication apparatus providing user authentication for controlling access to one of the host electronic device or an electronically provided service provided by the host electronic device. The host electronic device may comprise at least one of a portable phone and a computing device. The electronically provided service may comprise at least one of providing access to, as an example, a web site or to an email account. The biometric authentication unit may be incorporated into a user authentication apparatus providing user authentication for controlling an online transaction. The user authentication may be in replacement of at least one of a user password or personal identification number. The biometric authentication unit may be incorporated into an apparatus providing user authentication for controlling access to a physical location or an apparatus providing user authentication demonstrating the user was present at a certain place at a certain time. The biometric authentication unit may comprise wherein the biometric authentication unit is incorporated into an apparatus providing finger mapping of a user finger to authentication of the user to the host electronic device and the performance of at least one other task specific to the particular finger by the host electronic device.

INCORPORATION BY REFERENCE

All publications, patents, and patent applications mentioned in this specification are herein incorporated by reference to the same extent as if each individual publication, patent, or patent application was specifically and individually indicated to be incorporated by reference, for all purposes and as if totally reproduced herein including all figures, appendices and claims.

BRIEF DESCRIPTION OF THE DRAWINGS

The novel features of the disclosed subject matter are set forth with particularity in the appended claims. A better understanding of the features and advantages of the present disclosed subject matter will be obtained by reference to the following detailed description that sets forth illustrative embodiments, in which the principles of the disclosed subject matter are utilized, and the accompanying drawings of which:

FIG. 1 is a chart illustrating stages in a tiered screening process conducted by a sensor before waking up a host digital device, according to aspects of embodiments of the disclosed subject matter;

DETAILED DESCRIPTION

Figure 2:
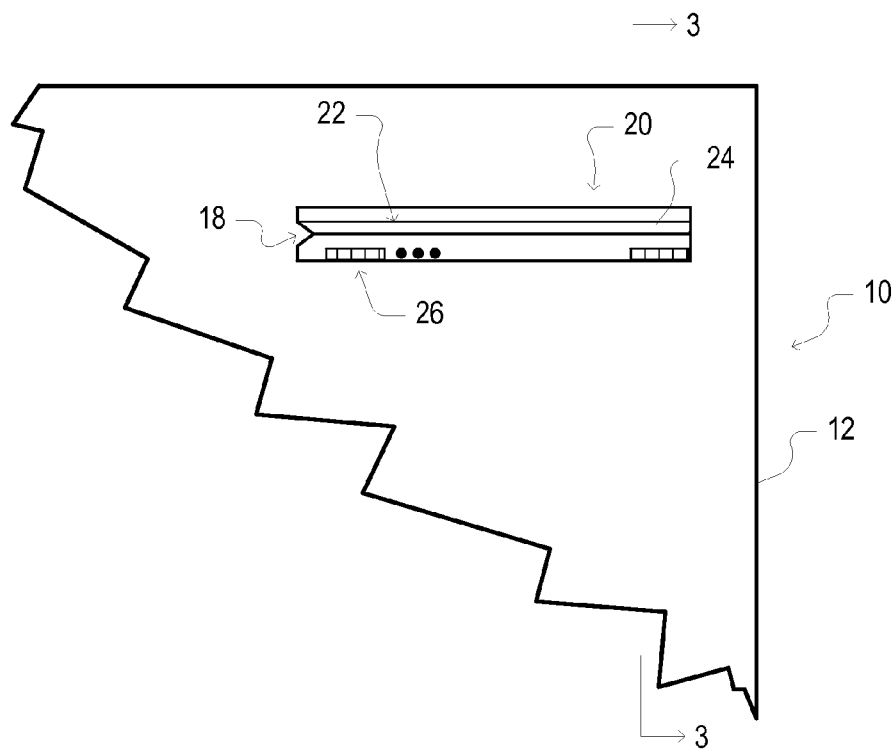
FIG. 2 shows a block diagram partly schematic view of a biometric object sensor, such as a fingerprint sensor, embedded in a housing of a host electronic device, according to aspects of embodiments of the disclosed subject matter.

The present disclosed subject matter provides a digital device, such as a portable personal digital assistant, digital pad device, portable phone or the like, that contains an authentication apparatus, such as a finger sensor for sensing a fingerprint image, which can operate in a minimal power consumption mode, e.g., by employing a tiered wakeup strategy according to aspects of the disclosed subject matter. When the sensor is its lowest power state and it receives information that may indicate the presence of an object that may be sensed for an image, such as a finger, in the vicinity of the sensor apparatus, the sensor may not have enough information initially to determine that there is an actual finger in the vicinity, and therefore, the sensor does not act to wake up the host right away. Instead, the sensor can wake a processor, such as a controller or microprocessor, e.g., a CPU on the sensor. The processor on the sensor apparatus can then do a more sophisticated analysis (e.g., a variance calculation, such as a history of variance or a smoothed variance of patterned image data or all or part of a frame image data, for an image or images, as is discussed by way of example in U.S. Pat. No. 7,474,772 B2, entitled SYSTEM AND METHOD FOR A MINIATURE USER INPUT DEVICE, issued to Russo et al., on Jan. 6, 2009, or a frequency calculation, or anti-spoofing techniques to determine a finger is in the vicinity, e.g., as discussed in U.S. Pat. No. 7,463,756 B2, entitled FINGER POSITION SENSING METHODS AND APPARATUS, issued to Benkley on Dec. 9, 2008, etc.) and only wake the host electronic device if some criteria or criteria from such testing is/are met indicating the presence of an actual finger to image for authentication to access the host electronic device. Therefore according to aspects of embodiments of the disclosed subject matter, as an example, the sensor can conduct at least two steps in a screening process before it wakes up the host. Another example might be the type of object motion detected, e.g., a gesture or like motion of an object, e.g., indicative of finger swiping, finger navigation movement, e.g., plucking, stroking, or motion angled to the normal direction of an image taking swipe, or any significant motion at all in any direction in a placement sensor, etc.

Most of the time, the sensor is in an ultra-low "waiting-for-finger" wake-on-event (WOE) mode. When a finger or another conductive object is initially detected, e.g., utilizing a bulk finger detection sensor, "waiting-for-finger" WOE logic can wake the sensor CPU, which may then, e.g., scan several lines of data from the proximate object and process it (e.g., using a variance or frequency or some other algorithm as noted above) to determine whether a bona-fide finger is on or in the vicinity of the sensor sensing elements or whether the event that triggered the sensor CPU to wake up was a false alarm. By employing these preliminary checks before waking the host electronic system false wake-ups of the host electronic device are prevented or at least significantly reduced.

It will be understood that alternate sensing schemes and/or special purpose sensing blocks and/or traces, or the like, may be utilized as one or more parts of one or more tiers after, e.g., the bulk sensor triggers the system and method to, e.g., gather more info. For example, one can sense other aspects of the object besides computable metrics from a partial biometric image, to determine if a biometric that can be sensed for authentication is present or not. That is, an ability exists to sense, as examples, pressure, optical energy, resistance and the like, in place of or in addition to capacitance. The system or method could then turn on the pressure, optical, resistive, etc. sensing after the initial trigger to determine or help determine the bona fide of biometric, e.g., finger, present on or near the sensor. As will be understood, various forms of such bona fides data can be collected and used. These same types of sensors may also be used to sense or partly sense the initial bulk presence, e.g., that starts the tiered wake-up process as discussed in the present application. Thus, "analyzing bona fides data" may include "one or more lines of biometric image" or one or more sets of data input from one or more of the other forms of bulk detection, e.g., pressure, optical energy, resistance, etc., rather than just the ability to use an alternative bulk sensor that might be operating at a higher power, e.g., in the second tier. Certain forms of anti-spoofing, such as is discussed in the co-pending U.S. patent application Ser. No. 13/763,377, filed on Feb. 8, 2013, entitled BIOMETRIC OBJECT SENSOR AND METHOD, incorporated by reference here, could provide some or all of the bona fides data. Further, e.g., for swiped type detectors, an inadvertent touch could be distinguished from an intentional touch, e.g., commencing a swipe, e.g., before going to the next level of the tiered wake-up. That is, a touch could be sensed and sensed again, e.g., several times within, e.g., 10 or so ms, to detect, e.g., if the sensed image is changing, which can indicate a swipe is occurring or at least commencing. If not, i.e., the image is relatively or essentially constant, then the onset of the next stage of the tiered wakeup can be held off, e.g., until there is an indication the object is moving, or until the object is sensed to have been removed, and, therefore, no start of the next tiered wakeup stage is necessary. Similarly, the tiered wakeup next stage, if started, can be delayed while this motion analysis occurs, and either restarted or cancelled depending on the outcome of such analysis. A first level of the tiered wakeup can, therefore, be activated, but, without the sensing of actual finger swiping motion, the next level of the tiered wake-up could be caused not to trigger. That would be the way to distinguish a bona fides touching and an inadvertent touching of the sensor elements, i.e., the sensed gesture signifying the bona fides of the object and "deliberate" user intention to use the sensor for object imaging.

While all of the above may be suitable bona fides input gatherers, it will be understood by those skilled in the art that, generally, the lower the power required the better the bona fides detector will be suited for the initial triggering of the more detailed bona fides detection. Afterward, power may still be a consideration, however, quickness and accuracy, or both, in making a proper bona fides decision before going to a next level(s) of powering-on/powering-up would be the main considerations.

It will further be understood that the biometric authentication system and method disclosed may comprise a biometric object sensor which may comprise sensor elements and a sensor computing device; a wake-on-event logic controller that may maintain the sensor computing device in one of a powered-off or powered down mode, and may include a bulk biometric object detector configured to detect a biometric object on or in the vicinity of the sensor elements and to power-on or power-up the sensor computing device responsive to the detection of the biometric object on or in the vicinity of the sensor elements; and the sensor computing device may also be configured to analyze one or more items of biometric bona fides data and determine if the biometric bona fides data belongs to a biometric object desired to be imaged to obtain a biometric object image for use in authenticating a user providing the biometric object image, and to provide a power-on or power-up signal to a host electronic device computing device when the biometric bona fides data indicates the biometric object is a biometric object desired to be imaged. The biometric authentication unit may also comprise wherein the sensor computing device and the host electronic device computing device share in the analysis of the biometric bona fides data to determine if the biometric bona fides data belongs to a biometric object desired to be imaged, and the host electronic device computing device is powered on at least to the extent of being configured to share in the analysis of the biometric bona fides data. The memory may be, at least in part, contained in or as a peripheral to the host electronic device computing device and the host electronic device may be powered on at least to the extent of being configured to share the memory with the sensor computing device while the sensor computing device is analyzing the biometric bona fides data to determine if the biometric bona fides data belongs to a biometric object desired to be imaged.

FIG. 1 illustrates stages that can be involved in a tiered screening process conducted by a sensor before an associated host digital device is powered up, e.g., from an off mode or at least a sleep mode. At Stage 1, a low-power wake-on-event ("WOE") circuit on the sensor can be polling while a high power processor on the sensor, e.g., a sensor CPU is off or in sleep mode. At Stage 2, the WOE on the sensor can have ceased polling, and the sensor CPU can have been powered up to a low power operating mode, or been removed from a sleep mode to the low power operating mode, e.g., conducting calculations as noted above, e.g., on a small number of linear array swipes or on a small image area ('frame") to validate the presence of a an object to be imaged, e.g., a finger. At Stage 3, the WOE is not polling, and the hosting electronic device, e.g., the CPU of the electronic device has been turned on or powered up, e.g., to a full power operating level to receive and process the results of imaging the finger by the sensor, i.e., as examples, reconstructing the fingerprint image, extracting minutia from the image, detecting a gesture or other movement of a finger (e.g., if the finger moves a particular way, such as during a swipe motion, the finger could be declared present), and/or authentication of the user of the electronic device by matching the image or minutia to a stored image or stored minutia.

It will be appreciated that the system provides numerous advantages. For instance, the sensor employs multiple checks in a tiered wakeup strategy, which includes at the least three aforesaid stages before waking the host in order to prevent false wakeups, thereby minimizing power consumption.

It should be understood that the system can have numerous modifications and variations. For instance, in an embodiment, if the user grips a system such as a phone is his/her pocket where, e.g., the palm of the user's hand is in the vicinity of the sensor, then the sensor WOE can determine the presence of what may be the object to be sensed, i.e., a finger, e.g., through the bulk finger (object) presence detection that occurs during polling of the sensor's bulk presence detector, and can then wake up the sensor's processor, e.g., the sensor's CPU. The sensor's CPU can then do a more extensive analysis of the data, e.g., determine that it looks like a finger (i.e., because the palm of the hand also has ridges and valleys, but not like those of a finger, so that frequency of presence, or statistical variation or difference sums, or like techniques can be utilized to distinguish a finger proximate the sensor from a palm proximate the sensor, etc). Depending on the result of such further detailed testing the sensor CPU can then wake up the host electronic device for, e.g., authentication processing.

It will also be understood, that authentication processing may be accomplished using the sensor CPU and memory on the sensor, with the host electronic device being powered up ("wakened") or powered on in conjunction with such authentication being performed on the sensor or after authentication is performed. The host electronic device may then, as an example, conduct a further part of the authentication process itself, such as verifying the authentication and/or acknowledging the receipt of the authentication, all of which is discussed by way of example in U.S. Patent Publication Nos. US 2011/0083160A1, entitled User Enrollment Via Biometric Device, published on Apr. 7, 2011, US2011/0083018A1 entitled Secure User Authentication, published Apr. 7, 2011, US2011/0083016A1 entitled Secure User Authentication Using Biometric Information published Apr. 7, 2011; US2011/0138450A1 entitled Secure Transaction Systems and Methods of Using User Authenticating Biometric Information published Jun. 9, 2011; US2011/0082791A1 entitled Monitoring Secure Financial Transactions published Apr. 7, 2011; US2011/0082801A1 entitled Secure Transaction Systems and Methods published Apr. 7, 2011; US2011/0082802A1 entitled Secure Financial Transaction Systems and Methods published Apr. 7, 2011; US2011/0082800A1 published Apr. 7, 2011; US2011/0083173A1 entitled Secure Transaction Systems and Methods published Apr. 7, 2011.

In order to prevent this process from happening over and over again while the user grips the phone this way, the host electronic device processor can send a message to the sensor CPU indicating that the object being sensed is not a finger, and that the sensor CPU should not report this object to the host or attempt authentication using this object, e.g., cease scanning the image of the object and/or making any such report, until the object departs the vicinity of the sensor. In response, the sensor CPU can command the WOE logic to watch for the object to leave contact with or the vicinity of the sensor (i.e., the opposite of where as the WOE normally watches for the object to land on or in the vicinity of the sensor). When the object leaves the sensor and the vicinity of the sensor, the WOE logic circuitry on the sensor may be programmed to respond in two ways: i) it can either wake the sensor CPU to indicate that this has happened, and the sensor CPU logic can decide what to do next or ii) alternatively, the WOE circuitry can immediately rearm itself and not wake the sensor CPU until another object lands on or in the vicinity of the sensor elements. In this way, the host electronic device is normally only powered on or powered up one time for each object coming in contact with or in the vicinity of the sensor, or in these unusual circumstances can minimize the false detections of an object to be imaged for authentication purposes, which lowers overall power requirements dramatically.

Therefore, according to aspects of the disclosed subject matter, the power consumed by the sensor apparatus being small compared to the power consumed by the host system, when the host electronic device is off or at least in a low-power "waiting-for-finger" WOE mode, it is important that the sensor not wake the host electronic device until absolutely necessary. Even if the sensor consumes slightly more power in order to be more certain that an actual finger is present, the overall system power consumption is lower than if the sensor fails to reduce or eliminate false wakeups of the host electronic device. To facilitate this, a tiered approach can be used according to aspects of embodiments of the disclosed subject matter.

It will be understood by those skilled in the art that according to aspects of the disclosed subject matter there can be provided a digital device containing a fingerprint or other biometric sensor that consumes power in an amount that is very small compared to the total power consumed by the hosting electronic device. The biometric sensor can be a conventional fingerprint sensor of a variety of types, e.g., capacitive linear and two dimensional arrays, optical arrays, piezoelectric arrays, resistance arrays and the like, which can have a wake-on-event module and a sensor processor, such as a computer processing unit (CPU). When the host electronic system is in an off or a low-power mode waiting to turn on or wake up due to the presence of a finger to be imaged and processed, the finger sensor will not wake the host electronic device at least until it is certain that an actual finger is present.

More particularly, even though the sensor may consume slightly more power in order to be "sure" whether or not an actual finger is present, the overall system power is lower if the sensor can prevent false powering-on or wakeups of the high power consuming host. To facilitate this, according to aspects of the disclosed subject matter, the sensor can employ a tiered wakeup strategy. Most of the time, the sensor is in an ultra-low power waiting-for-finger mode. When a finger or another conductive object is detected on or in the vicinity of the sensor elements, the WOE "waiting-for-finger" logic on the sensor can wake the CPU of the sensor, which can then scan several lines of data and process it (e.g., using a variance or some other suitable algorithm, as discussed above) to determine whether a bona-fide finger has landed on or is in the vicinity of the sensor elements or whether the event that triggered the sensor to wake-up its CPU is a false alarm. Should the sensor CPU determine that a bone-fide finger has landed on or in the vicinity of the sensor, the sensor can then wake-up the host. The system can therefore operate on minimal power.

Figure 3:
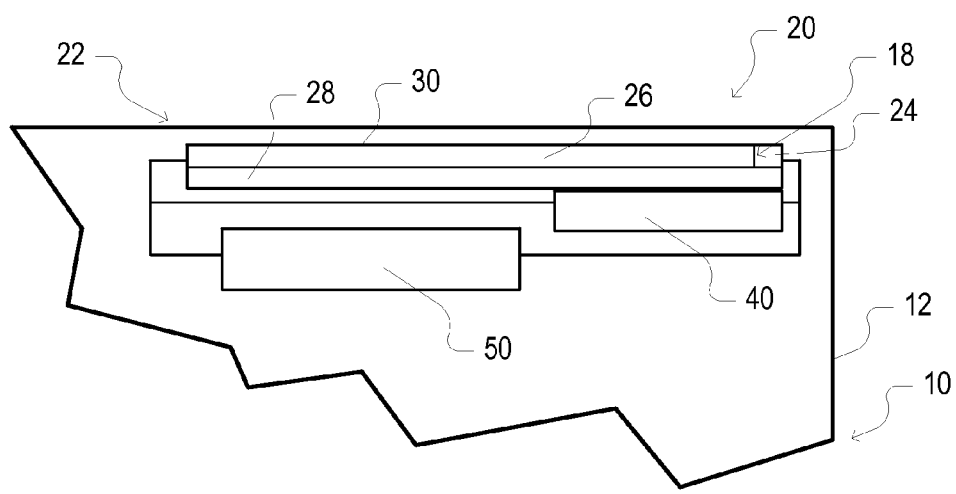
FIG. 3 shows a cross-sectional view along line 3-3 of FIG. 2.
Figure 4:
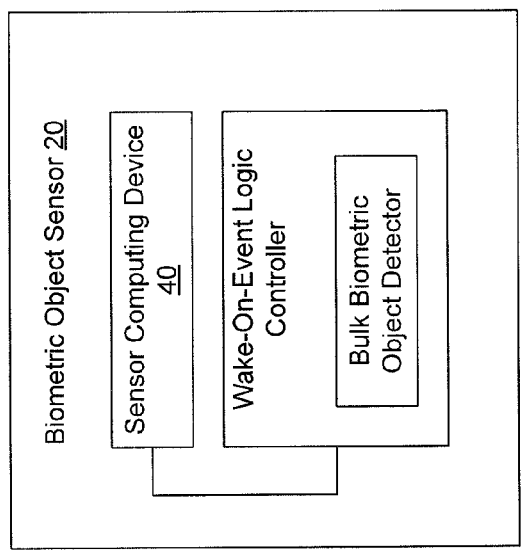
FIG. 4 shows a block diagram of the biometric object sensor, according to aspects of embodiments of the disclosed subject matter.

Turning now to FIGS. 2 and 3, there is shown a partly schematic top view of a biometric object sensor, such as a fingerprint sensor 20, embedded in a housing 12 of a host electronic device 10, according to aspects of embodiments of the disclosed subject matter. FIG. 3 shows a cross-sectional view along line 3-3 of FIG. 2. The biometric object sensor 20 may be a fingerprint image sensor, such as a linear one dimensional array capacitive gap sensor 22 comprising a transmitter or receiver plate 24 and a plurality of receiver or transmitter plates 26, which may be formed on a substrate 28, such as a flexible substrate made from, e.g., Kapton® tape and having the transmitter and receiver traces printed on the flex tape as is well known in the art.

The biometric object sensor may be embedded into the housing 12 of a host electronic device 10, such that the sensor elements 24, 26 are protected by a protective coating 30, which may also be transparent. Pixel locations are defined in the linear one dimensional gap capacitive biometric image sensor at the gap 18 formed at each of the junctions between a transmitter/receiver trace 26 of the plurality of transmitter/receiver traces 26 and the single receiver/transmitter plate ('trace') 26. The biometric object sensor 22 is shown in FIG. 2 as cut away, as is the housing 12 itself, and the ellipsis " . . . " shows that not all of the plurality of transmitter/receiver traces perpendicular to the single receiver/transmitter trace and separated by spaces, are shown in FIG. 2.

FIG. 3 shows that the single transmitter/receiver 24 is connected within the housing 12 of the host electronic device 10 to both a sensor computing device 40, e.g., in the form of a sensor integrated circuit (IC) CPU 40 and to a host electronic device computing device 50, e.g., in the form of one of at least one host electronic device I/C CPU 50. It will be understood that the biometric imaging and authentication operations may be shared between the sensor computing device 40 and the host computing device 50. Therefore, the tiered wakeup may similarly be shared. As an example, even when the host electronic device 50 is off or in a very low power mode, such as a sleep mode, the host electronic device computing device 50 and the sensor computing device 40 may share memory (not shown); the shared memory may reside on the sensor computing device 40 or the host electronic device computing device, or both or may be wholly or partly external to one or both of the sensor computing device and the host electronic device computing device.

Similarly, the sensor computing device and the host electronic device computing device may share the performance of the characterization of the object image being sensed as a biometric object desired to be sensed and tested for authentication. As an example, the sensor computing device may be tasked simply with driving the sensor lead(s) acting as transmitter traces and detecting output from the sensor lead(s) acting as receiver traces and storing the receive partial image, e.g., in the case of a linear one dimensional capacitive gap sensor one or more lines of the image, but not all of the image, and storing that partial image in a memory on the sensor IC, the host electronic device CPU IC or external memory which may be shared by both the sensor computing device and the host electronic device computing device.

Thus the host electronic device may not be totally off before a bona fide biometric object to be detected and analyzed is determined to be on or in the vicinity of the sensor traces, but may, e.g., have the computing device 50 of the host electronic device in a sleep mode that permits the host electronic device computing device to analyze the line or lines of the partial image sensed by the sensor through the sensor computing device, before turning on the rest of the host electronic device, which may include other high power consumption circuitry, e.g., other computing devices, mixed signal devices, memory(ies) etc. It will, therefore, be understood by those skilled in the art that, as used herein, powering on or powering up the host electronic device in the disclosed tiered wakeup strategy, means powering the host electronic device on or up so that it can perform its full intended functions, but this may be from a state where the circuitry of the host electronic device may already be powered on and/or powered up, including at least some part or all of at least one host electronic device computing device that is used to assist in the determination that the object being sensed as on or in the vicinity of the sensor sensing elements (traces) is a bona fide object desired to be sensed for, e.g., authentication of the user from whom the object is sensed, in order to authenticate starting up the host electronic device or utilizing some part or all of the capabilities of the host electronic device as an authorized user, based on analysis of a image of the object, such as an image of the fingerprint of the user.

It will also be understood by those skilled in the art that a biometric authentication apparatus and method is disclosed which may comprise a biometric authentication unit which may comprise: a biometric object sensor comprising sensor elements and a sensor computing device; a wake-on-event logic controller maintaining the sensor computing device in one of a powered-off, i.e., WOE logic and power to a relatively small number of sensor elements, or specific bulk finger sensor elements, is all that is utilized initially to sense a presence of a bulk object on or in the vicinity of the sensor elements, which may or may not be a biometric object desired to be images, such as a finger and a fingerprint. Alternatively a very low power powered-down mode may perform the same function, and thus may include a bulk biometric object detector configured to detect a biometric object on or in the vicinity of the sensor elements and to power-on or power-up the sensor computing device responsive to the detection of the biometric object on or in the vicinity of the sensor elements. The sensor computing device may be configured to analyze one or more lines of biometric object image comprising a partial biometric object image, for example, up to a few scans of a linear one dimensional sensor array, or a frame of a two dimensional swipe sensor array or some portion, e.g., up to a few lines, of the frame, or up to a few lines of a two dimensional placement sensor array, and determine if such a partial biometric image belongs to a biometric object desired to be imaged to obtain a complete biometric object image, and to provide a power-on or power-up signal to a host electronic device or to at least a portion of the host electronic device, such as a host electronic device computing device when the partial biometric image is determined to belong to a biometric object desired to be imaged, such as a fingerprint.

The biometric authentication unit may further comprise the biometric object comprising a finger and the complete biometric object image comprising a fingerprint of sufficient dimensions and resolution to match the fingerprint or extractions from the fingerprint, e.g. fingerprint minutia, stored for authentication purposes. The host electronic device may comprise a housing; and the sensor computing device and the host electronic device computing device may be housed within the housing. The sensor elements may be exposed to the biometric object through the housing. The sensor computing device and the host electronic device computing device may share a memory, which may be wholly or partly within the host computing device or a peripheral device to the host computing device.

The biometric authentication unit may comprise the sensor computing device and the host electronic device computing device sharing in the analysis of the one or more lines of biometric object image comprising a partial biometric object image and determine if the partial biometric image belongs to a biometric object desired to be imaged. The host electronic device computing device may thus be powered on, e.g., from an off or sleep mode, at least to the extent of being configured to share in the analysis of the partial biometric object image. The memory may be at least in part contained in or as a peripheral to the host electronic device computing device, e.g., as a memory unit connected to the CPU of the host electronic device computing device, e.g., connected directly to the CPU over a memory bus and/or controlled as to access by a memory management unit within or as another peripheral device to the CPU. The host electronic device may be powered on at least to the extent of being configured to share the memory with the sensor computing device while the sensor computing device is analyzing the one or more lines of biometric object image comprising a partial biometric object image and determine if the partial biometric image belongs to a biometric object desired to be imaged. All of these just mentioned configurations being considered to be within the scope of the claimed subject matter wherein the sensor computing device and/or the host computing device are kept at a very low power sufficient to be activated when a bulk object detector using the sensor elements or separate bulk detector elements, powered on with just enough power to perform the needed initial bulk object detection. The bulk object detection may be powered purely by the sensor, e.g. using WOE logic in the sensor computing device, or in conjunction with the host electronic device, such as through the host electronic device computing device, or some combination thereof, and then powered up, again jointly or separately just enough to analyze up to a few lines of an available partial biometric image available from the sensor elements, and then further sufficiently to authenticate a sensed biometric image, and finally the entire host electronic device may be powered on once the user is authenticated.

The biometric authentication unit may further comprise the biometric object sensor elements forming a linear one dimensional capacitive gap sensor array or a two dimensional placement capacitive sensor array or a two dimensional swiped capacitive sensor array.

A biometric authentication method may comprise providing a biometric object sensor comprising sensor elements and a sensor computing device; utilizing a wake-on-event logic controller maintaining the sensor computing device in one of a powered-off or powered-down mode, and including a bulk biometric object detector to detect a biometric object on or in the vicinity of the sensor elements and to power-on or power-up the sensor computing device responsive to the detection of the biometric object on or in the vicinity of the sensor elements; analyzing with the sensor computing device one or more lines of biometric object image comprising a partial biometric object image and determining if the partial biometric image belongs to a biometric object desired to be imaged to obtain a complete biometric object image; and providing a power-on or power-up signal to a host electronic device computing device when the partial biometric image is determined to belong to a biometric object desired to be imaged.

A machine readable medium storing instructions that, when executed by at least one computing device, may cause the at least one computing device to perform a biometric authentication method on a biometric object sensor comprising sensor elements and a sensor computing device which may comprise: controlling a wake-on-event logic controller maintaining the sensor computing device in one of a powered-off or powered-down mode, and detecting, in conjunction with a bulk biometric object detector, a biometric object on or in the vicinity of the sensor elements, and powering on or powering up the sensor computing device responsive to the detection of the biometric object on or in the vicinity of the sensor elements; analyzing with the sensor computing device one or more lines of biometric object image comprising a partial biometric object image and determining if the partial biometric image belongs to a biometric object desired to be imaged to obtain a complete biometric object image; and providing a power-on or power-up signal to a host electronic device computing device when the partial biometric image is determined to belong to a biometric object desired to be imaged.

The biometric authentication unit wherein the biometric authentication unit is incorporated into a user authentication apparatus providing user authentication for controlling access to one of the host electronic device or an electronically provided service provided over the host electronic device. The host electronic device may comprise at least one of a portable phone and a computing device. The electronically provided service may comprise at least one of providing access to, for example, a web site or to an email account. The biometric authentication unit may be incorporated into a user authentication apparatus providing user authentication for controlling an online transaction. The user authentication may be in replacement of at least one of a user password or personal identification number. The biometric authentication unit may be incorporated into an apparatus providing user authentication for controlling access to a physical location or an apparatus providing user authentication demonstrating the user was present at a certain place at a certain time. The biometric authentication unit of wherein the biometric authentication unit is incorporated into an apparatus providing finger mapping of a user finger to authentication of the user to the host electronic device and the performance of at least one other task specific to the particular finger by the host electronic device.

It will be understood by those skilled in the art that the present apparatus and method may be incorporated into many useful apparatus and methods, e.g., where the authentication of a user can be of benefit to security of operation, non-repudiation of transactions, user access to electronic equipment, physical and virtual locations etc. Some of these might include by way of examples, incorporation into: a user authentication apparatus providing user authentication for controlling access to one of an electronic user device, such as a portable phone, personal digital assistant, computing devices in general, etc. or an electronically provided service, such as access to a web-site/page, access to and utilization of an email account, access to other on-line data, files and the like; and a user authentication apparatus providing user authentication for controlling an online transaction.

In each of the above, the apparatus may provide for user authentication that is in replacement of at least one of a user password or personal identification number ("PIN"). The sensing circuit may be incorporated into an apparatus providing user authentication for controlling access to a physical location or for demonstrating the user was present at a certain place at a certain time. The sensing circuit of may be incorporated into an apparatus providing at least one of a finger motion user input or navigation to a computing device.

The sensing circuit may be incorporated into an apparatus providing finger mapping of a user finger to authentication of the user, e.g., for access to or energizing a user electronic device and the performance of at least one other task specific to the particular finger by the user electronic device. The sensing circuit may be incorporated into a user authentication apparatus providing user authentication for purposes of making an on-line transaction non-repudiatable.

The following is a disclosure by way of example of a computing device which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least emulate a computing device. The computing device may include an inter-connect (e.g., bus and system core logic), which can interconnect such components of a computing device to a data processing device, such as a processor(s) or microprocessor(s), or other form of partly or completely programmable or pre-programmed device, e.g., hard wired and/or application specific integrated circuit ("ASIC") customized logic circuitry, such as a controller or microcontroller, a digital signal processor, or any other form of device that can fetch instructions, operate on pre-loaded/pre-programmed instructions, and/or follow instructions found in hard-wired or customized circuitry, to carry out logic operations that, together, perform steps of and whole processes and functionalities as described in the present disclosure.

In this description, various functions, functionalities and/or operations may be described as being performed by or caused by software program code to simplify description. However, those skilled in the art will recognize what is meant by such expressions is that the functions resulting from execution of the program code/instructions are performed by a computing device as described above, e.g., including a processor, such as a microprocessor, microcontroller, logic circuit or the like. Alternatively, or in combination, the functions and operations can be implemented using special purpose circuitry, with or without software instructions, such as using Application-Specific Integrated Circuit (ASIC) or Field-Programmable Gate Array (FPGA), which may be programmable, partly programmable or hard wired. The application specific integrated circuit ("ASIC") logic may be such as gate arrays or standard cells, or the like, implementing customized logic by metallization(s) interconnects of the base gate array ASIC architecture or selecting and providing metallization(s) interconnects between standard cell functional blocks included in a manufacturers library of functional blocks, etc. Embodiments can thus be implemented using hardwired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually affect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory, or external (to the microprocessor) memory such as main memory, or a disk drive, or external to the computing device, such as a remote memory, a disc farm or other mass storage device(s), etc. Commercially available microprocessors, one or more of which could be a computing device or part of a computing device, include a PA-RISC® series microprocessor from Hewlett-Packard Company, an 80x86 or Pentium® series microprocessor from Intel Corporation, a PowerPC® microprocessor from IBM, a Sparc® microprocessor from Sun Microsystems, Inc, or a 68xxx series microprocessor from Motorola Corporation as examples.

The inter-connect in addition to interconnecting such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The interconnect may include one or more buses connected to one another through various bridges, controllers and/or adapters. In one embodiment the I/O controller may include a USB (Universal Serial Bus) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application.

At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instant of time.

In general, a tangible machine readable medium includes any tangible mechanism that provides (i.e., stores) information in a form accessible by a machine (i.e., a computing device), which may be included, e.g., in a communication device, a network device, a personal digital assistant, a mobile communication device, whether or not able to download and run applications from the communication network, such as the Internet, e.g., an iPhone®, Blackberry®, Droid® or the like smart phone, a manufacturing tool, or any other device including a computing device, comprising one or more data processors, etc.

In one embodiment, a user terminal can be a computing device, such as in the form of or included within a PDA, a cellular phone, a notebook computer, a personal desktop computer, etc. Alternatively, the traditional communication client(s) may be used in some embodiments of the disclosed subject matter.

While some embodiments of the disclosed subject matter have been described in the context of fully functioning computing devices and computing systems, those skilled in the art will appreciate that various embodiments of the disclosed subject matter are capable of being distributed, e.g., as a program product in a variety of forms and are capable of being applied regardless of the particular type of computing device machine or computer-readable media used to actually effect the distribution.

The disclosed subject matter may be described with reference to block diagrams and operational illustrations of methods and devices to provide a system and methods according to the disclosed subject matter. It will be understood that each block of a block diagram or other operational illustration (herein collectively, "block diagram"), and combination of blocks in a block diagram, can be implemented by means of analog or digital hardware and computer program instructions. These computing device software program code/instructions can be provided to the computing device such that the instructions, when executed by the computing device, e.g., on a processor within the computing device or other data processing apparatus, the program software code/instructions cause the computing device to perform functions, functionalities and operations of a method(s) according to the disclosed subject matter, as recited in the accompanying claims, with such functions, functionalities and operations specified in the block diagram.

It will be understood that in some possible alternate implementations, the function, functionalities and operations noted in the blocks of a block diagram may occur out of the order noted in the block diagram. For example, the function noted in two blocks shown in succession can in fact be executed substantially concurrently or the functions noted in blocks can sometimes be executed in the reverse order, depending upon the function, functionalities and operations involved. Therefore, the embodiments of methods presented and described as a flowchart(s) in the form of a block diagram in the present application are provided by way of example in order to provide a more complete understanding of the disclosed subject matter. The disclosed flow and concomitantly the method(s) performed as recited in the accompanying claims are not limited to the functions, functionalities and operations illustrated in the block diagram and/or logical flow presented herein. Alternative embodiments are contemplated in which the order of the various functions, functionalities and operations may be altered and in which sub-operations described as being part of a larger operation may be performed independently or performed differently than illustrated or not performed at all.

Although some of the drawings may illustrate a number of operations in a particular order, functions, functionalities and/or operations which are not now known to be order dependent, or become understood to not be order dependent, may be reordered and other operations may be combined or broken out. While some reordering or other groupings may have been specifically mentioned in the present application, others will be or may become apparent to those of ordinary skill in the art and so the disclosed subject matter does not present an exhaustive list of alternatives. It should also be recognized that the aspects of the disclosed subject matter may be implemented in parallel or seriatim in hardware, firmware, software or any combination(s) thereof co-located or remotely located, at least in part, from each other, e.g., in arrays or networks of computing devices, over interconnected networks, including the Internet, and the like.

It will be understood by those skilled in the art that the present apparatus and method may be incorporated into many useful apparatus and methods where the authentication of a user can be of benefit to security of operation, non-repudiation of transactions, user access to electronic equipment, physical and virtual locations etc. Some of these might include by way of examples, incorporation into: a user authentication apparatus providing user authentication for controlling access to one of an electronic user device, such as a portable phone, personal digital assistant, computing devices in general, etc. or an electronically provided service, such as access to a web-site/page, access to and utilization of an email account, access to other on-line data, files and the like; a user authentication apparatus providing user authentication for controlling an online transaction.

In each of the above, the apparatus may provide for user authentication that is in replacement of at least one of a user password or personal identification number ("PIN").

The sensing circuit may be incorporated into an apparatus providing user authentication for controlling access to a physical location or for demonstrating the user was present at a certain place at a certain time.

The sensing circuit of may be incorporated into an apparatus providing at least one of a finger motion user input or navigation to a computing device.

The sensing circuit may be incorporated into an apparatus providing finger mapping of a user finger to authentication of the user, e.g., for access to or energizing a user electronic device and the performance of at least one other task specific to the particular finger by the user electronic device.

The sensing circuit may be incorporated into a user authentication apparatus providing user authentication for purposes of making an on-line transaction non-repudiatable.

The disclosed subject matter is described in the present application with reference to one or more specific exemplary embodiments thereof. Such embodiments are provided by way of example only. It will be evident that various modifications may be made to the disclosed subject matter without departing from the broader spirit and scope of the disclosed subject matter as set forth in the appended claims. The specification and drawings are, accordingly, to be regarded in an illustrative sense for explanation of aspects of the disclosed subject matter rather than a restrictive or limiting sense. Numerous variations, changes, and substitutions will now occur to those skilled in the art without departing from the disclosed subject matter. It should be understood that various alternatives to the embodiments of the disclosed subject matter described herein may be employed in practicing the disclosed subject matter. It is intended that the following claims define the scope of the disclosed subject matter and that methods and structures within the scope of these claims and their equivalents be covered thereby.

What is claimed is:

1. A biometric authentication unit comprising:
   a biometric object sensor comprising sensor elements and a sensor processor; and
   wake-on-event circuitry maintaining the sensor processor in at least one of a powered-off or powered down mode, and including a bulk biometric object sensor configured to detect a biometric object on or in a vicinity of the sensor elements and to power-on or power-up the sensor processor responsive to the detection of the biometric object on or in the vicinity of the sensor elements;
   wherein the sensor processor is configured to communicate with a host electronic device, the host electronic device including a host electronic computing device separate from the sensor processor,
   wherein, when the biometric object is present on or in the vicinity of the sensor elements, the sensor processor is configured to analyze one or more items of biometric bona fides data of the biometric object and received from the biometric object sensor to determine if the biometric object is desired to be imaged for use in authenticating a user providing the biometric object,
   wherein when the biometric bona fides data is determined to indicate that the biometric object is not desired to be imaged, the sensor processor commands the wake-on-event circuitry to monitor for the biometric object to leave contact with the sensor elements or leave the vicinity of the sensor elements, and
   wherein after commanding the wake-on-event circuitry to monitor for the biometric object to leave contact with or the vicinity of the sensor elements, the sensor processor returns to the at least one of the powered-off or the powered down mode and will be woken by the wake on event circuitry after the biometric object leaves contact with or the vicinity of the sensor elements.

2. The biometric authentication unit of claim 1 wherein the biometric object comprises a fingerprint.

3. The biometric authentication unit of claim 1 wherein the host electronic device comprises a housing, and the sensor processor is housed within the housing.

4. The biometric authentication unit of claim 3 wherein the sensor elements are exposed to the biometric object through the housing.

5. The biometric authentication unit of claim 1 wherein the sensor processor and the host electronic device are configured to share a memory.

6. The biometric authentication unit of claim 5 wherein the memory is at least partially contained in or is a peripheral to the host electronic device and the host electronic device is powered on at least to an extent of being configured to share the memory with the sensor processor while the sensor processor is analyzing the biometric bona fides data to determine if the biometric object is desired to be imaged.

7. The biometric authentication unit of claim 1 wherein the sensor processor and the host electronic computing device are configured to share in the analysis of the biometric bona fides data to determine if the biometric object is desired to be imaged, and the host electronic computing device is powered on at least to an extent of being configured to share in the analysis of the biometric bona fides data.

8. The biometric authentication unit of claim 1 wherein the sensor elements form a linear one dimensional capacitive gap sensor array.

9. The biometric authentication unit of claim 1 wherein the sensor elements form a two dimensional placement capacitive sensor array.

10. The biometric authentication unit of claim 1 wherein the sensor elements form a two dimensional swiped capacitive sensor array.

11. The biometric authentication unit of claim 1 wherein the biometric authentication unit is incorporated into a user authentication apparatus providing user authentication for controlling access to one of the host electronic device or an electronically provided service provided over the host electronic device.

12. The biometric authentication unit of claim 11 wherein the host electronic device comprises at least one of a portable personal digital assistant, digital pad device, and a portable phone.

13. The biometric authentication unit of claim 11 wherein the electronically provided service comprises at least one of providing access to a web site or to an email account.

14. The biometric authentication unit of claim 1 wherein the biometric authentication unit is incorporated into a user authentication apparatus providing user authentication for controlling an online transaction.

15. The biometric authentication unit of claim 1 wherein the biometric authentication unit is incorporated into an apparatus providing finger mapping of a user finger for authentication of the user to the host electronic device and performance of at least one other task specific to the user finger by the host electronic device.

16. The biometric authentication unit of claim 1, wherein the bulk biometric object sensor is configured to use capacitive sensing to detect presence of a conductive object, and wherein the sensor processor is configured to determine if the conductive object belongs to a fingerprint using a variance calculation.

17. The biometric authentication unit of claim 1, wherein the bulk biometric object sensor comprises a subset number of a total number of the sensor elements of the biometric object sensor.

18. The biometric authentication unit of claim 1, wherein the bulk biometric object sensor comprises a dedicated bulk finger sensor element.

19. The biometric authentication unit of claim 1, wherein the wake-on-event circuitry automatically arms itself to detect another biometric object on or in the vicinity of the sensor elements when the biometric object leaves contact with or the vicinity of the sensor elements.

20. The biometric authentication unit of claim 1, wherein after the biometric object leaves contact with or the vicinity of the sensor elements, the sensor processor will be woken by the wake on event circuitry when another biometric object comes in contact with or the vicinity of the sensor elements.

21. A biometric authentication method comprising:
   providing a biometric object sensor comprising sensor elements and a sensor processor;
   utilizing wake-on-event circuitry maintaining the sensor processor in at least one of a powered-off or powered down mode;
   detecting a biometric object on or in a vicinity of the sensor elements with a bulk biometric object sensor to power-on or power-up the sensor processor responsive to the detection of the biometric object on or in the vicinity of the sensor elements;

analyzing with the sensor processor one or more items of biometric bona fides data of the biometric object and received from the biometric object sensor and determining, based on the biometric bona fides data, if the biometric object is desired to be imaged for use in authenticating a user providing the biometric object;

determining that the biometric object is not desired to be imaged;

commanding, by the sensor processor, the wake-on-event circuitry to monitor for the biometric object to leave contact with the sensor elements or leave the vicinity of the sensor elements; and after commanding the wake-on-event circuitry to monitor for the biometric object to leave contact with or the vicinity of the sensor elements, returning the sensor processor to the at least one of the powered-off or the powered down mode, wherein the sensor processor will be woken by the wake on event circuitry after the biometric object leaves contact with or the vicinity of the sensor elements.

22. The biometric authentication method of claim 21, wherein after the biometric object leaves contact with or the vicinity of the sensor elements, the sensor processor will be woken by the wake on event circuitry when another biometric object comes in contact with or the vicinity of the sensor elements.

23. A non-transitory machine readable medium storing instructions that, when executed by at least one computing device, cause the at least one computing device to perform a biometric authentication method on a biometric object sensor comprising sensor elements and a sensor processor, the biometric authentication method comprising:

controlling wake-on-event circuitry maintaining the sensor processor in at least one of a powered-off or powered down mode;

detecting a biometric object on or in a vicinity of the sensor elements with and including a bulk biometric object sensor to power-on or power-up the sensor processor responsive to the detection of the biometric object on or in the vicinity of the sensor elements;

analyzing with the sensor processor one or more items of biometric bona fides data of the biometric object and received from the biometric object sensor and determining, based on the biometric bona fides data, if the biometric object is desired to be imaged for use in authenticating a user providing the biometric object;

determining that the biometric object is not desired to be imaged;

commanding, by the sensor processor, the wake-on-event circuitry to monitor for the biometric object to leave contact with the sensor elements or leave the vicinity of the sensor elements; and after commanding the wake-on-event circuitry to monitor for the biometric object to leave contact with or the vicinity of the sensor elements, returning the sensor processor to the at least one of the powered-off or the powered down mode, wherein the sensor processor will be woken by the wake on event circuitry after the biometric object leaves contact with or the vicinity of the sensor elements.

24. The non-transitory machine readable medium of claim 23, wherein after the biometric object leaves contact with or the vicinity of the sensor elements, the sensor processor will be woken by the wake on event circuitry when another biometric object comes in contact with or the vicinity of the sensor elements.

* * * * *